United States Patent
Kato

(10) Patent No.: US 6,963,725 B2
(45) Date of Patent: Nov. 8, 2005

(54) INFORMATION COMMUNICATION TERMINAL APPARATUS

(75) Inventor: Sei Kato, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 714 days.

(21) Appl. No.: 09/927,905

(22) Filed: Aug. 13, 2001

(65) Prior Publication Data

US 2002/0028676 A1 Mar. 7, 2002

(30) Foreign Application Priority Data

Aug. 11, 2000 (JP) ........................................ 2000-244710

(51) Int. Cl.$^7$ ............................................. H04N 5/445
(52) U.S. Cl. ................. 455/3.04; 455/3.06; 455/414.1; 725/39; 725/87; 725/89; 725/100
(58) Field of Search ....................... 455/3.06, 405–408, 455/414.1, 418–420, 424, 556.1, 566, 344, 352; 725/87, 100, 39, 104, 101, 131, 139, 151; 348/461, 906, 10; 709/203, 219, 218, 225, 227; 370/390

(56) References Cited

U.S. PATENT DOCUMENTS

| | | | | | |
|---|---|---|---|---|---|
| 5,539,920 | A | * | 7/1996 | Menand et al. | 725/151 |
| 5,844,620 | A | * | 12/1998 | Coleman et al. | 725/54 |
| 6,144,661 | A | * | 11/2000 | Katsube et al. | 370/390 |
| 6,169,896 | B1 | * | 1/2001 | Sant et al. | 455/424 |
| 6,463,586 | B1 | * | 10/2002 | Jerding | 725/37 |
| 6,792,616 | B1 | * | 9/2004 | Jerding et al. | 725/38 |

* cited by examiner

*Primary Examiner*—David Hudspeth
*Assistant Examiner*—Kamran Afshar
(74) *Attorney, Agent, or Firm*—Sughrue Mion, PLLC

(57) ABSTRACT

An information communication terminal apparatus which is capable of performing search processing or preset processing for received services within a short period of time. There is provided an identifier which specifies an attribute of a service to be included for the search processing or the preset processing. A table in which the attributes of the received services are registered is searched through based on the identifier. The search processing or the preset processing is performed only for those services that match with the identifier.

33 Claims, 7 Drawing Sheets

FIG. 2

RECEIVED SERVICE ATTRIBUTE TABLE

| SERVICE NO. | ATTRIBUTE DEFINITION HEADER | | | | | ............ |
|---|---|---|---|---|---|---|
| | b7 | b6 | b5 | .... | b0 | |
| No.1 | 1 | 0 | 0 | ..... | ... | ............ |
| No.2 | 0 | 0 | 1 | ..... | ... | ............ |
| No.3 | 0 | 1 | 0 | ..... | ... | ............ |
| No.4 | 1 | 0 | 0 | ..... | ... | ............ |
| ⋮ | ⋮ | ⋮ | ⋮ | .... | ... | ............ |

MEANING OF THE RESPECTIVE BITS
OF ATTRIBUTE DEFINITION HEADER

7TH BIT  $b7 = 1$ → INDICATING THAT THE SERVICE IS A FREE SERVICE

6TH BIT  $b6 = 1$ → INDICATING THAT THE SERVICE IS A SUBSCRIBED PAY SERVICE

5TH BIT  $b5 = 1$ → INDICATING THAT THE SERVICE IS A NON-SUBSCRIBED PAY SERVICE

PROCESS OF SETTING A RECEIVED SERVICE SEARCH IDENTIFIER

STRUCTURE OF RECEIVED SERVICE SEARCH IDENTIFIER

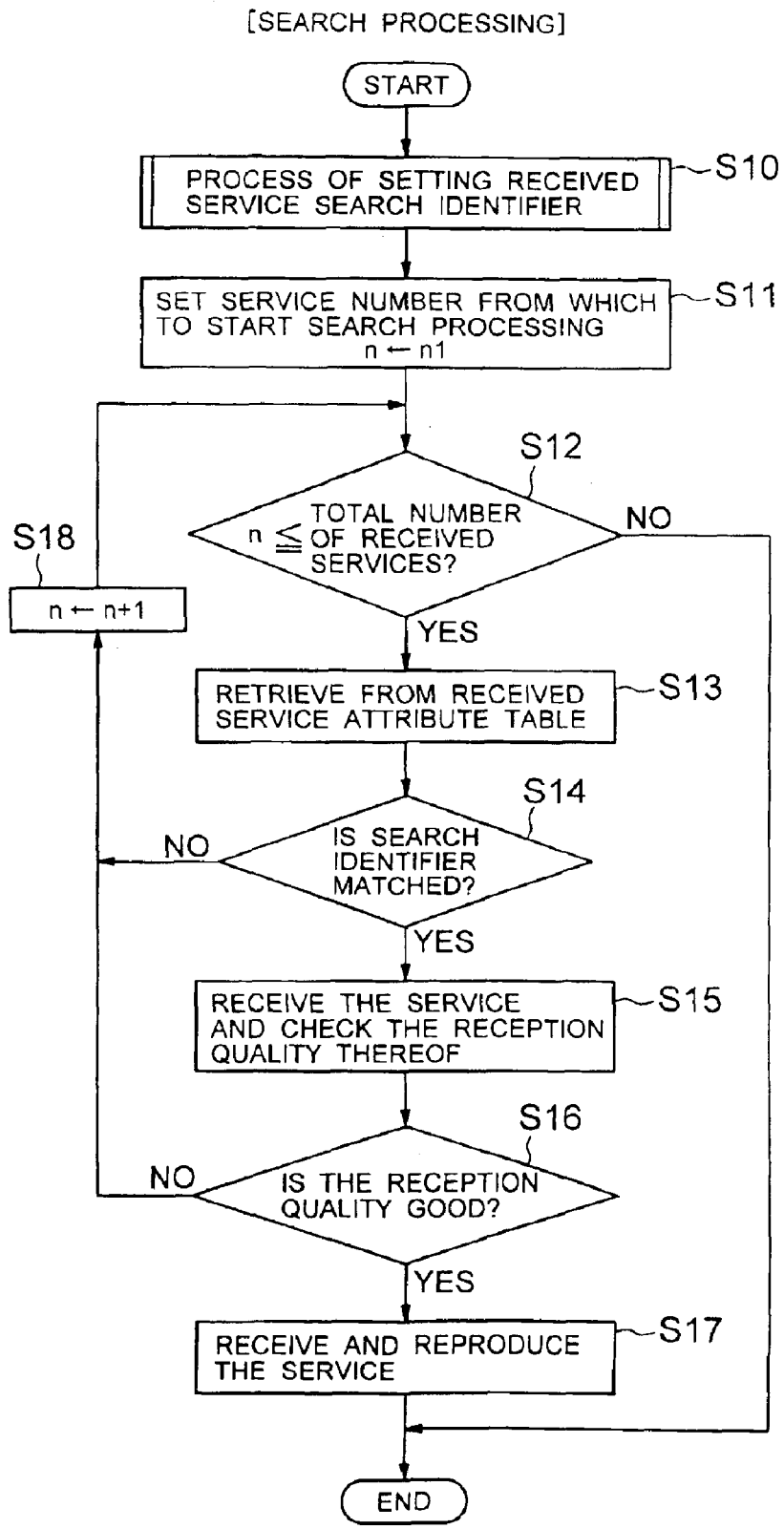

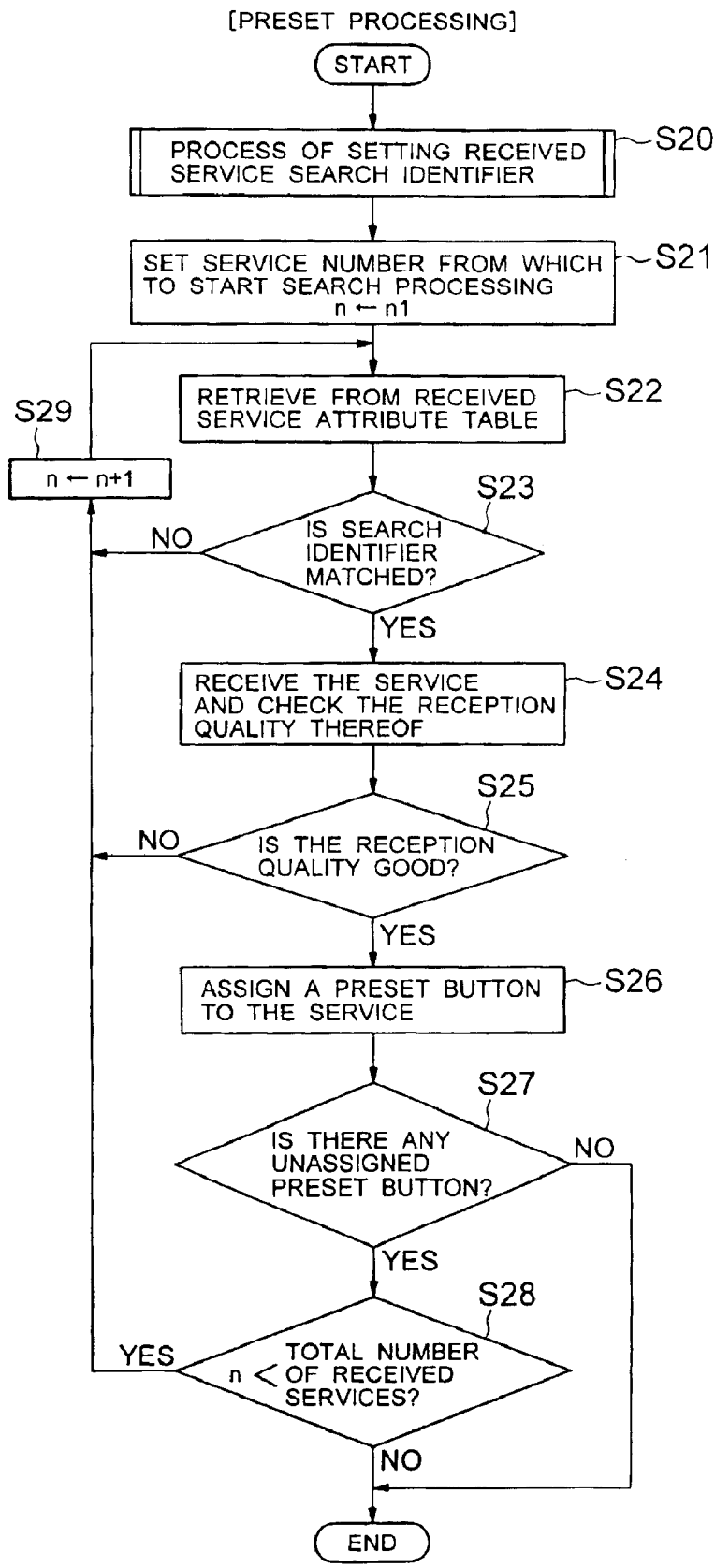

INFORMATION COMMUNICATION TERMINAL APPARATUS

BACKGROUND OF THE INVENTION

1. Field of the Invention

The present invention relates to an information communication terminal apparatus for selectively receiving and reproducing a plurality of pay or free information providing services (hereinafter referred to simply as "services") via broadcasting communication media such as digital broadcasting, CATV and the Internet.

2. Description of the Related Art

With an information communication terminal apparatus for receiving a plurality of pay or free services via broadcasting communication media such as digital broadcasting, CATV and the Internet, it is possible to arbitrarily select and use services from among subscribed pay services and free services.

Herein, "service" is a concept similar to "channel" as in conventional analog broadcasting. Thus, each of "services" independently provides the user with information such as a sports program or a music program. Any user can use the free services, whereas a user needs to have a prescribed subscription with the service provider (broadcaster) in order to use a pay service.

Such an information communication terminal apparatus employs various processing functions for all received services in order to improve the usefulness of the device. These processing functions include search processing, preset processing, service information display processing, etc.

Herein, "search processing" refers to a process of retrieving receivable services. Specifically, "search processing" refers to a process of retrieving through all services until a service that is receivable with a good reception quality, and then starting receiving and reproducing the service. As described above, an "receivable service" is a free service or a subscribed pay service.

"Preset processing" refers to a process of retrieving receivable services and storing information for obtaining the services. For example, "preset processing" refers to a process of retrieving from all services to be received and assigning a plurality of preset buttons to the receivable services in the order of reception quality.

"Service information display processing" refers to a process of displaying the title and content of each service so as to inform the user of the type of the service. Specifically, it refers to a process of retrieving from all services to find receivable services and then displaying the service information thereof on the display of the terminal device.

However, in the service distributed via digital broadcasting and the Internet these days, there are a huge number of services to be provided. Therefore, the processing as described above will take a long time. When the information communication terminal apparatus is installed in an automobile, the device may be operated during the operation of the automobile. Therefore, it is preferred also for the sake of safe driving that the processing should be completed quickly.

OBJECTS AND SUMMARY OF THE INVENTION

The present invention has been made in view of the problem described above. The present invention has an object to provide an information communication terminal apparatus capable of performing search and preset processing for receivable services within a short period of time.

The present invention provides an information communication terminal apparatus for receiving a plurality of services, having: a service attribute determination part for determining an attribute of each of the plurality of services; and a service selection part for selecting a service to be used from among the plurality of services, wherein the service selection part excludes, from candidates for the selection, any service whose attribute indicates that the service is a non-subscribed pay service, based on the determination by the service attribute determination part.

BRIEF EXPLANATION OF THE DRAWINGS

FIG. 2 illustrates a received service attribute table provided in a RAM area of a memory unit 14 in the device of FIG. 1.

FIG. 4 is a flow chart illustrating search processing in the device of FIG. 1.

FIG. 5 is a flow chart illustrating preset processing in the device of FIG. 1.

DETAILED DESCRIPTION OF THE PREFERRED EMBODIMENTS

Figure 1:
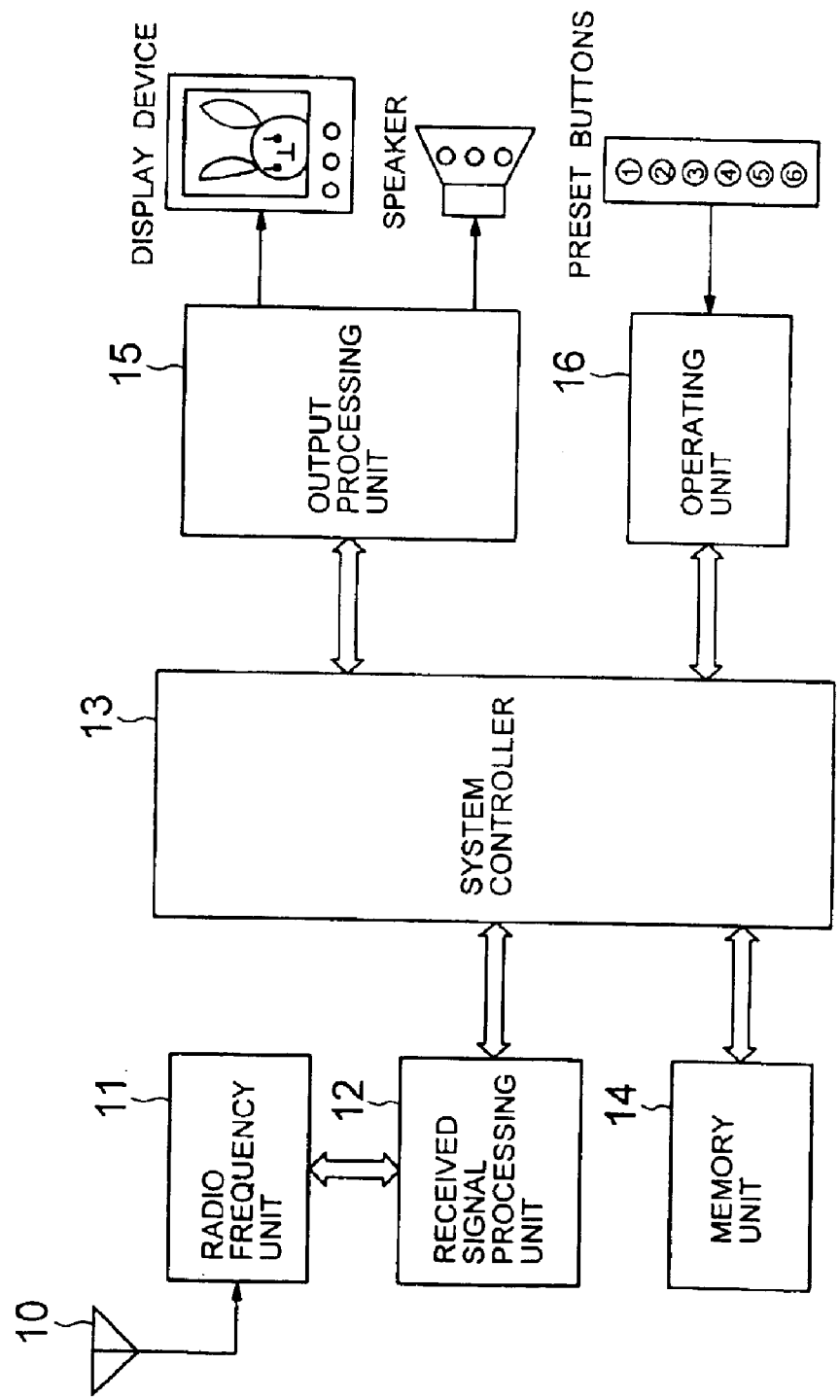
FIG. 1 is a block diagram illustrating a configuration of a digital broadcasting receiver as an embodiment of the present invention.

FIG. 1 is a block diagram illustrating a configuration of a digital broadcasting receiver according to the present invention.

In FIG. 1, a receiving antenna 10 is a small-sized high gain antenna such as a rod antenna or a dielectric antenna. The receiving antenna 10 receives digital broadcasting waves from a broadcast station.

A radio frequency unit 11 is a radio frequency processing circuit for performing processing such as amplification of a received wave, frequency conversion and wave detection. The radio frequency unit 11 is a circuit corresponding to a front end unit in a receiver.

A received signal processing unit 12 performs various processing that is required for accurate reproduction of received signals, such as de-interleave processing and error correction processing, on received data which has been detected and demodulated. The received signal processing unit 12 is a circuit for decoding data for each service included in the received signals.

A system controller 13 includes a microcomputer (hereinafter referred to as "$\mu$CPU") as its main component. The system controller 13 controls the overall operation of the receiver. The $\mu$CPU executes a main program of the receiver and various sub-programs such as a subroutine for the search processing and the preset processing of the present invention, that are stored in a memory unit 14 to be described later, in synchronism with the internal clock.

The memory unit 14 includes storage devices such as a ROM (Read Only Memory) and a RAM (Random Access Memory). The ROM stores various programs for controlling the operation of the receiver as described above. The RAM temporarily stores various calculation values during a process, and the state of various flag registers (hereinafter referred to simply as "flags"), based on which determinations are made in the process.

The memory unit 14 also includes a non-volatile RAM. In the non-volatile RAM area, there is provided a received service attribute table defining the attributes of a plurality of received services.

The received service attribute table (hereinafter referred to simply as "table") is a table as illustrated in FIG. 2 defining the attributes of all the services provided from digital broadcasting stations to the receiver. In the embodiment of FIG. 2, a 1-byte attribute definition header (hereinafter referred to simply as "header") is provided at the beginning of the table, i.e., in the header section. The upper 3 bits of the header are used to define whether each service is a pay service or a free service, and whether each pay service has been subscribed by the user.

Specifically, the 7th bit (hereinafter referred to as "b7"), i.e., the most significant bit of the header, being "1" indicates that the service is a free service. The 6th bit (hereinafter referred to as "b6") being "1" indicates that the service is a pay service that has been subscribed by the user. The 5th bit (hereinafter referred to as "b5") being "1" indicates that the service is a non-subscribed pay service.

This will be described below based on the specific embodiment illustrated in FIG. 2. In the service "No.1" registered in the table, b7 of the header is "1", indicating that the service is a free service. For the service "No. 2", the header thereof indicates that it is a non-subscribed pay service. For the service "No. 3", the header thereof indicates that it is a subscribed pay service.

The structure and the contents of the table are not limited to the embodiment illustrated in FIG. 2. Any other table structure and contents may be employed as long as the attribute of each service can be uniquely determined based on the service number thereof.

The contents of the table, i.e., the attribute of each service, may be written and/or erased by the user upon subscription and/or unsubscription, for example. Alternatively, attribute data of each service may be downloaded from the service provider via transmission media such as digital broadcasting or the Internet to a corresponding area of the table.

An output processing unit 15 is a processing circuit for outputting video signals and audio signals from a received and reproduced the services to a display device such as a CRT or a liquid crystal panel, and an audio device such as a loudspeaker or a headphone.

An operating unit 16 is a unit for inputting various instructions, data, and the like, to the receiver. The operating unit 16 includes a keyboard, a group of various switches, or the like. The operating unit 16 also includes preset buttons for service selection, which are required for the preset processing of the present invention.

The search processing for received services in the digital broadcasting receiver illustrated in the block diagram of FIG. 1 will now be described.

As described above, the search processing is a process of searching for a service that is receivable with a good reception quality from among a large number of services provided by digital broadcasting stations, and receiving and reproducing the services. FIG. 4 illustrates a flow chart of a subroutine program for the search processing.

The system controller 13 executes the subroutine of FIG. 4 by interrupting the main routine (not shown) of the receiver, which is constantly running in synchronism with the internal clock. The search processing subroutine may be started, for example, by an interrupt signal generated when the user specifies the search processing by operating a key of the operating unit 16. Alternatively, the subroutine may be automatically started when the reception quality of the service being currently received deteriorates in order to search for an alternative service.

In the subroutine of FIG. 4, the system controller 13 first calls and executes a sub-program called a "process of setting a received service search identifier" (hereinafter referred to simply as "identifier setting process") (step 10).

Figure 3A:
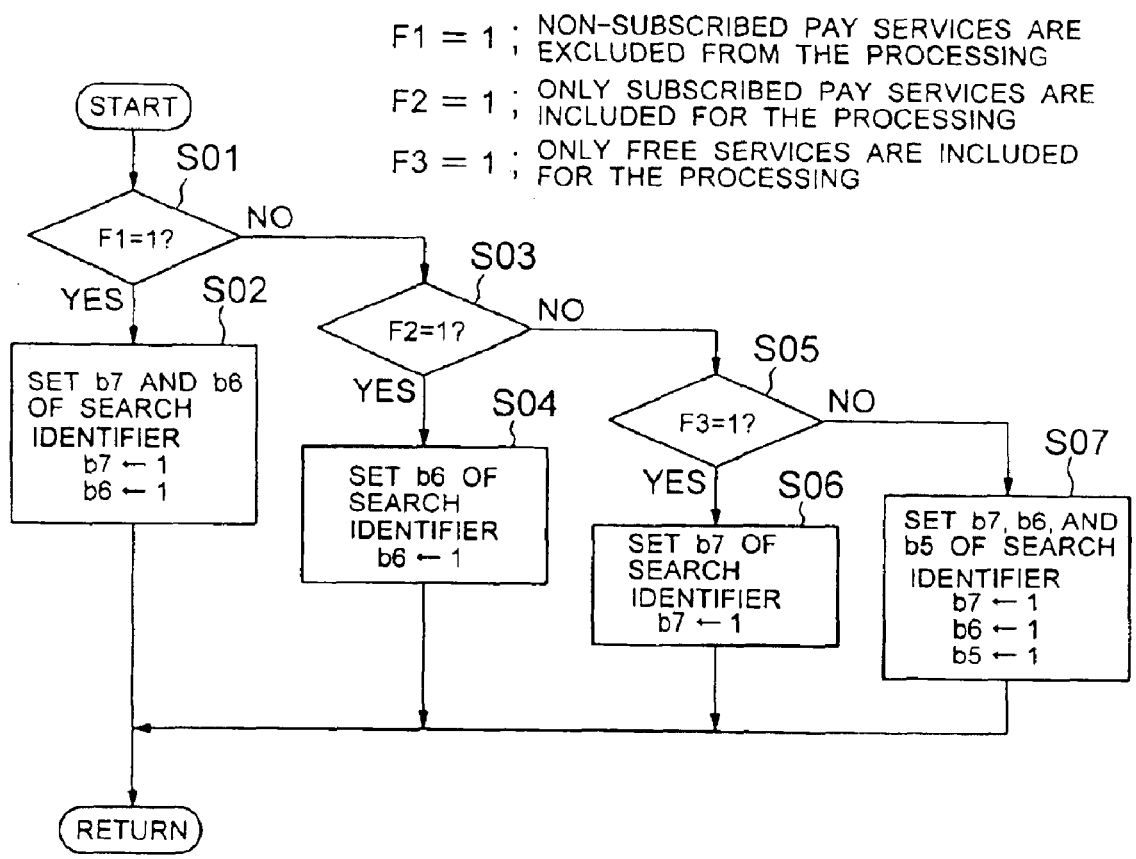
FIG. 3A is a flow chart illustrating a process of setting a received service search identifier in the device of FIG. 1.
Figure 3B:
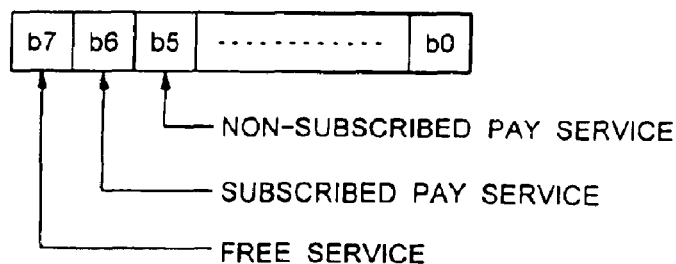
FIG. 3B illustrates a structure of the received service search identifier.

"Received service search identifier" (hereinafter referred to simply as "identifier") is a 1-byte register as illustrated in FIG. 3B. The identifier has a bit configuration corresponding to that of the header provided in the first byte of the table illustrated in FIG. 2. The identifier is used to identify the attribute of a service while retrieving the header of the service included in the table of FIG. 2. In other words, the identifier is used to identify the header of each service in which the bit corresponding to the "1" bit among b7 to b5 of the identifier is set.

The sub-program called in step 10 is as illustrated in the flow chart of FIG. 3A. In the sub-program, the system controller 13 determines the state of each of flags F1, F2 and F3 (steps 01, 03 and 05, respectively). Then, the system controller 13 sets a corresponding bit of the identifier according to the set or reset state of each flag. Thus, the flags F1 to F3 identify received services to be included for the search and preset processing. When F1=1, non-subscribed pay services are excluded from the processing. When F2=1, only the subscribed pay services are included for the processing. When F3=1, only free services are included for the processing.

The flags F1 to F3 are set or reset by an instruction of the user through the operating unit 16. For example, consider a case where the user desires that only free services are searched for during the search processing. In such a case, the user uses a keyboard or a function key of the operating unit 16 to input the instruction prior to the processing, thereby setting F3 to "1" and resetting F1 and F2 to "0".

In the sub-program of FIG. 3A, the system controller 13 sets b7 and b6 of the identifier to "1" when F1=1 (step 02). The system controller 13 sets b6 to "1" when F2=1 (step 04), and sets b7 to "1" when F3=1 (step 06). When none of the flags is "1", the system controller 13 sets all of b7, b6 and b5 to "1" considering that all services registered in the table are to be included for the operations (step 07).

Upon completion of the setting of the identifier in the sub-program of FIG. 3A, the system controller 13 returns to the search processing subroutine of FIG. 4. Then, in step 11, the system controller 13 sets the count value of a search counter (hereinafter referred to simply as "counter") used when searching through the table to n, and the service number from which to start the search processing to n1. In a typical search processing, the search processing is started from the currently or previously selected service. Therefore, the system controller 13 sets the service number to the corresponding initial value n1.

The value of n1 may be input by the user at the beginning of the search processing through the keyboard, or the like, of the operating unit 16. For example, when the user desires that the search processing is performed starting from the first service registered in the table, the user can set n1 to "1".

When the user determines that the user does not need to use the services up to the 50th service, the user can set n1 to "51".

Then, the system controller 13 determines in step 12 whether the search counter value n has reached the total number of received services, i.e., the total number of services registered in the table. When n has not reached the total number of received services, the system controller 13 retrieves the header of the n-th service from the table in step 13. Then, the system controller 13 extracts the header and compares it with the identifier for determination (step 14).

When one of b7 to b5 of the extracted header and the corresponding bit of the identifier are both "1", the service having the header is a service that should be included for the search processing.

When such a service is detected, the system controller 13 receives the service and checks the reception quality thereof in step 15. The reception of the service and the check for the reception quality thereof are performed via the received signal processing unit 12. The system controller 13 determines the reception quality based on the reception level, the error rate, etc., of the service, which are measured by the received signal processing unit 12.

When the reception quality of the service is good (step 16), the system controller 13 provides the data received from the service to the output processing unit 15, and completes the search processing (step 17).

When it is determined in step 14 that the attribute of the service searched for does not match with the identifier, or when it is determined in step 16 that the reception quality of the service is poor, the system controller 13 proceeds to step 18. Then, the system controller 13 increments the count value n of the counter to n+1, and returns to step 12 to repeat the table search processing. When it is determined in step 12 that the count value n has reached the total number of received services, the system controller 13 terminates the search processing to return to the main routine (not shown).

As described above in detail, according to the present invention, the search processing can be performed only for free services or only for subscribed pay services, for example. Alternatively, the search processing can be performed excluding non-subscribed pay services. With the present invention, the search processing can be performed while limiting the services to be searched for, whereby the search processing can be completed within a short period of time.

Next, the preset processing will be described. As described above, the preset processing is a process of retrieving and storing receivable services. FIG. 5 is a flow chart illustrating a subroutine of the preset processing.

The subroutine is started by an interrupt signal generated when the user specifies the execution of the preset processing by operating a key of the operating unit 16.

In the subroutine of FIG. 5, the system controller 13 first calls and executes the sub-program of the identifier setting process in step 20. As described above, the subprogram is as illustrated in the flow chart of FIG. 3A. The system controller 13 executes the sub-program, thereby setting the type of services to be included for the preset processing in the corresponding one of the bits b7 to b5 of the identifier. For example, when the preset processing is to be performed only for free services, the 7th bit (b7) of the identifier is set to "1". When the preset processing is to be performed while excluding non-subscribed pay services, two bits, b7 and b6, of the identifier are set to "1".

After executing the sub-program operation of FIG. 3A, the system controller 13 returns to the subroutine of FIG. 5.

Then, the system controller 13 sets the count value n of the table search counter to the service number of the service from which searching is to be started (step 21). In a typical preset processing, the preset processing is started from the currently or previously selected service. Therefore, the system controller 13 sets the service number thereof to the count value n as the initial value n1.

Then, the system controller 13 proceeds to step 22, and retrieves the n-th service from among the services registered in the table based on the count value. Then, the system controller 13 compares the header of the retrieved service and the identifier. When one of the bits of the header and the corresponding bit of the search identifier are both set, it is determined that the service having the header is a service to be included for the preset processing (step 23).

When the retrieved service is a service to be included for the preset processing, the system controller 13 receives the service and determines the reception quality thereof in step 24. The reception operation is performed via the received signal processing unit 12. Then, the system controller 13 determines the reception quality based on the reception level and the error rate, which are measured by the received signal processing unit 12 (step 25).

When the reception quality is good, the system controller 13 proceeds to step 26. Then, the system controller 13 assigns one of the preset buttons of the operating unit 16 to the service, and stores the assignment information in the RAM area of the memory unit 14.

Any of various methods can be used for assigning a preset button to a received service. For example, the preset buttons may be simply assigned to qualified services successively along with the progress of the subroutine. Alternatively, the preset buttons may be assigned to free services with a higher priority over subscribed pay services. Alternatively, the preset buttons may be assigned to free services and subscribed pay services so that they are separated from each other. Alternatively, the preset buttons may be assigned to the services in the order of reception quality.

Then, in step 27, the system controller 13 determines whether there is any unassigned preset button that can be assigned to a new service. When all the preset buttons have been assigned, the preset processing is terminated.

When there is an unassigned preset button, the system controller 13 proceeds to step 28, in which the system controller 13 determines whether the table search count value n has reached to the total number of received services registered in the table. When the count value has reached the total number of received services, the system controller 13 terminates the preset processing.

When it is determined in step 23 that the header of the retrieved service from the table does not match with the identifier, when it is determined in step 25 that the reception quality of the service is not good, or when it is determined in step 28 that the table search count value n has not reached the total number of received services, the system controller 13 proceeds to step 29. Then, the system controller 13 increments the count value n to n+1, and returns to step 22 to repeat the subroutine.

As described above in detail, according to the present invention, the preset processing can be performed while limiting the scope of services for the processing to only free services or only subscribed pay services, for example. Alternatively, the preset processing can be performed while excluding non-subscribed pay services. Thus, the preset processing can be performed while limiting the services to be included for the processing, whereby it is possible to complete the preset processing within a short period of time.

Figure 6:
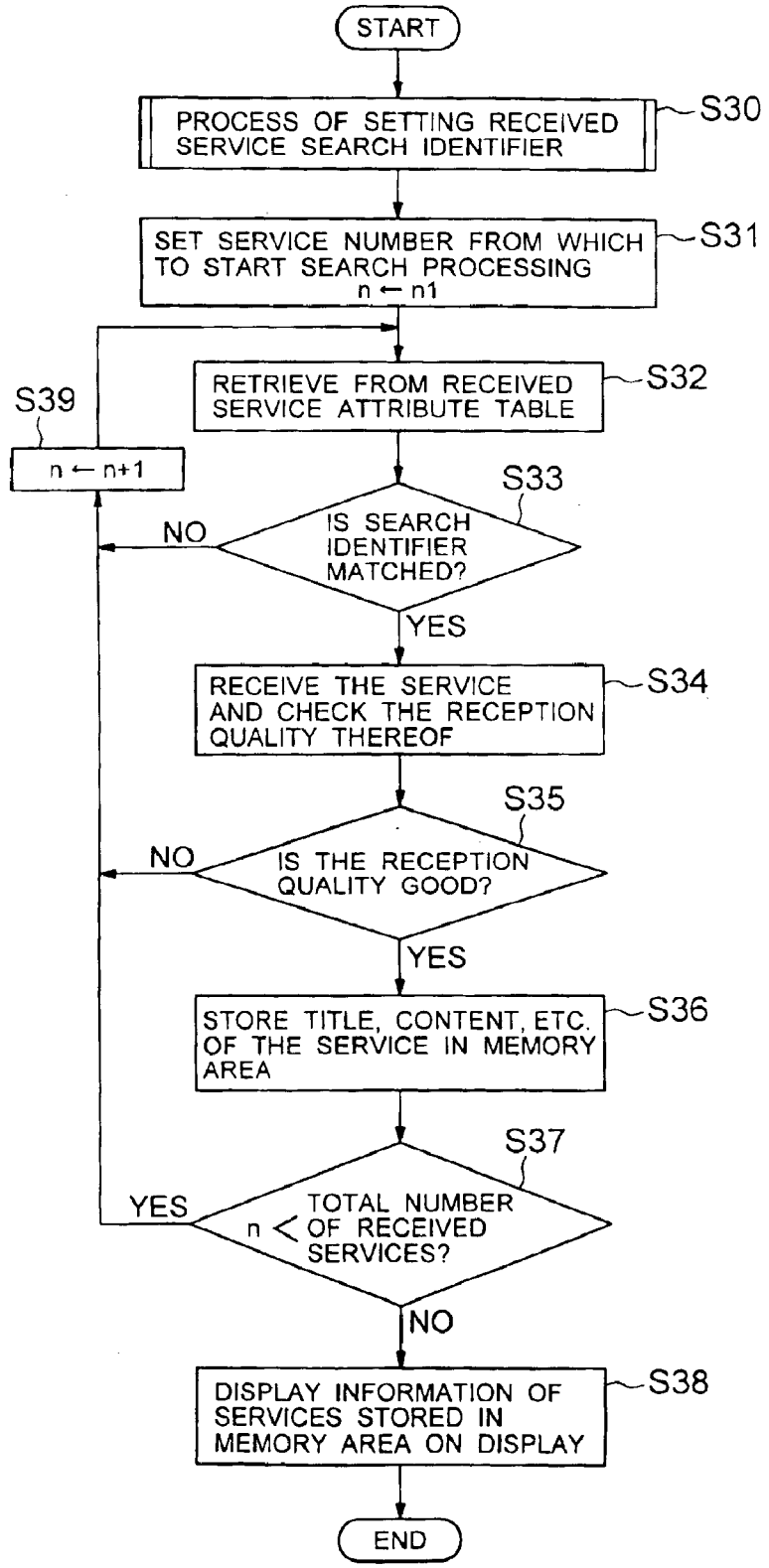
FIG. 6 is a flow chart illustrating service information display processing in the device of FIG. 1.

Next, the service information display processing will be described. "Service information display processing" (hereinafter referred to simply as "display processing") refers to a process of displaying the title and content of each receivable services on the display of the receiver. FIG. 6 is a flow chart illustrating the subroutine of the display processing.

The subroutine is started by an interrupt signal generated when the user specifies the execution of the display processing by operating a key of the operating unit 16.

In the flow chart of FIG. 6, the system controller 13 retrieves the header of the table for each services, after performing the identifier setting process. Then, the system controller 13 extracts a service matching with the identifier, and determines the reception quality of the service. The series of processing so far (step 30 to step 35) are as those of the preset processing described above. Therefore, the display processing subroutine will be described starting from step 36 in FIG. 6.

When it is determined in step 35 that the reception quality of the service included for the processing is good, the system controller 13 proceeds to step 36. The system controller 13 extracts the title and content of the service from the table, and stores them in a predetermined RAM area of the memory unit 14. In a case where the summary of the service is distributed via digital broadcasting, the system controller 13 may additionally store such information in the RAM area.

The system controller 13 determines whether the table search count value n has reached the total number of services registered in the table in step 37. When the count value n has reached the total number of services, the system controller 13 displays information of the service, such as the title and content thereof, which has been stored in the RAM area, on the display of the receiver via the output processing unit 15 (step 38).

When it is determined in step 37 that the count value n has not reached the total number of received services, when it is determined in step 35 that the reception quality of the service is not good, or when it is determined in step 33 that the header of the service retrieved from the table does not match with the identifier, the system controller 13 proceeds to step 39. Then, the system controller 13 increments the count value n to n+1, and returns to step 32 to repeat the subroutine of the operation.

As described above in detail, according to the present invention, the user can perform the service information display processing while limiting the scope of services to only free services or only subscribed pay services. Alternatively, the user can selectively review only receivable services while excluding non-subscribed pay services. Thus, the user can easily select a service. Especially, in the case where the service information is displayed as a list, the display space can be reduced.

According to the present embodiment, only receivable services are displayed in the processing of displaying the title and content, etc., of services on the display in step 38. Alternatively, all services registered in the table may be displayed, and a particular mark or a particular color, for example, being attached to receivable services among all the services. This has the following advantage. The user can know whether an unreceivable service is unreceivable because the user has not subscribed the service or because the reception quality thereof has deteriorated. Thus, the user can clearly identify the reason for which a service is unreceivable.

Figure 7:
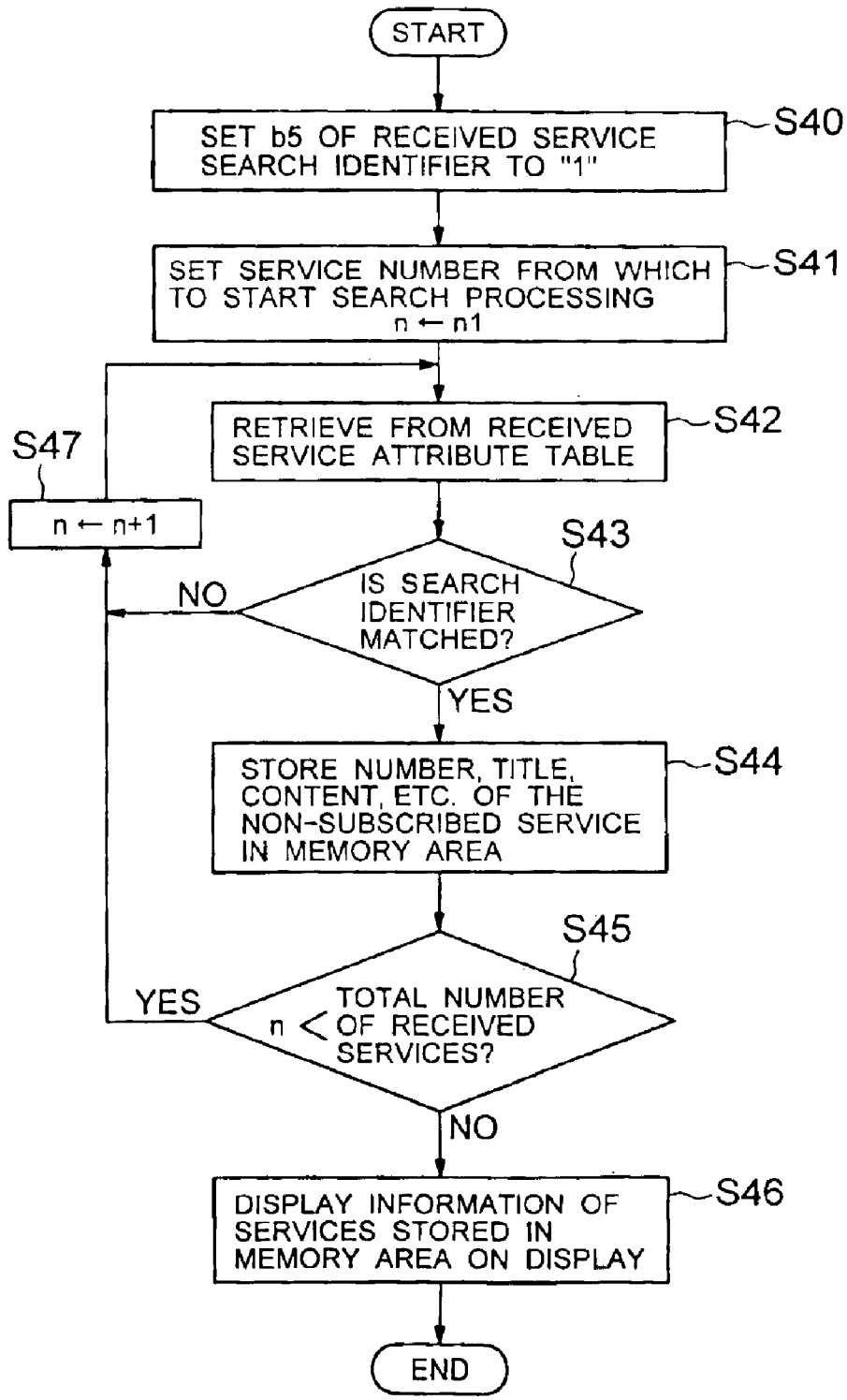
FIG. 7 is a flow chart illustrating new subscription search processing in the device of FIG. 1.

Then, new subscription search processing will be described. The new subscription search processing is a process required when the user newly subscribes a pay service. Specifically, this is a process of extracting only non-subscribed pay services from among all the received services registered in the table, while displaying the title and content of each of the extracted services on the display. FIG. 7 is a flow chart illustrating the subroutine of the processing. The subroutine is started by an interrupt signal from the operating unit 16 that instructs execution of the processing.

In the subroutine of FIG. 7, the system controller 13 first sets the fifth bit (b5) of the received service search identifier to "1" (step 40). In this subroutine, unlike the search processing or the preset processing described above, the sub-program of the identifier setting process illustrated in FIG. 3A is not called. This is because the system controller 13 can always simply set b5 of the identifier as described above since this operation is always performed only for non-subscribed pay services.

In step 41, the system controller 13 sets the initial value n1 to the table search count value n. Then, in the next step, step 42, the system controller 13 retrieves the header of the service of the count value n from the table. The fifth bit (b5) of the header being "1" means that the service is a non-subscribed pay service (step 43). In such a case, the system controller 13 retrieves and extracts the number, the title, the content, etc., of the service from the table in step 44. Then, the system controller 13 loads the data in a predetermined RAM area of the memory unit 14.

Then, the system controller 13 determines whether the count value n has reached the total number of received services registered in the table (step 45). When the count value n has reached the total number, the system controller 13 outputs the data regarding the non-subscribed pay service, which has been loaded in the predetermined RAM area, on the display of the receiver via the output processing unit 15 (step 46).

When it is determined in step 45 that the count value n has not reached the total number, or when it is determined in step 43 that the retrieved service does not match with the identifier, the system controller 13 proceeds to step 47. Then, the system controller 13 increments the count value n to n+1, and returns to step 42 to repeat the subroutine.

As described above in detail, according to the present invention, the new subscription search processing can be performed only for non-subscribed pay services. Therefore, it is possible to complete the new subscription search processing within a short period of time.

While the present invention has been described above with respect to a digital broadcasting receiver as an embodiment, the present invention is not limited thereto. For example, the present invention may alternatively be an information communication terminal apparatus for receiving a plurality of pay or free services via any of various communication media such as CATV, a telephone line, and the Internet.

As described above in detail, according to the present invention, when executing a process such as search processing or preset processing on the received services, it is possible to limit the type of services to be included for the processing according to the processing. Therefore, it is possible to provide an information communication terminal apparatus capable of performing an operation such as a search processing or a preset processing at a high speed.

It is understood that the foregoing description and accompanying drawings set forth the preferred embodiments of the invention at the present time. Various modification, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

This is application is based on a Japanese Patent Application No.2000-244710 which is hereby incorporated by reference.

What is claimed is:

1. An information communication terminal apparatus for receiving a plurality of services, comprising:
   a service attribute determination part for determining an attribute of each of said plurality of services; and
   a service selection part for selecting a service to be used from among said plurality of services,
   wherein said service selection part excludes, from candidates for selection, any service whose attribute indicates that the service is a non-subscribed pay service, based on determination by said service attribute determination part.

2. The information communication terminal apparatus according to claim 1, further comprising a search part for performing search processing of retrieving a receivable service from said plurality of services,
   wherein said search part excludes, from candidates for said search processing, any service whose attribute indicates that the service is a non-subscribed pay service, based on determination by said service attribute determination part.

3. The information communication terminal apparatus according to claim 1, further comprising a preset part for performing preset processing of extracting a receivable service from said plurality of services, and assigning a predetermined preset button to a information for obtaining said receivable service,
   wherein said preset part excludes, from candidates for said preset processing, any service whose attribute indicates that the service is a non-subscribed pay service, based on determination by said service attribute determination part.

4. The information communication terminal apparatus according to claim 1, further comprising an information display part for performing information display processing of displaying information regarding a title and a content of each of said plurality of services,
   wherein said information display part excludes, from candidates for said information display processing, any service whose attribute indicates that the service is a non-subscribed pay service, based on determination by said service attribute determination part.

5. An information communication terminal apparatus for receiving a plurality of services, comprising:
   a service attribute determination part for determining an attribute of each of said plurality of services; and
   a service selection part for selecting a service to be used from among said plurality of services,
   wherein said service selection part includes, as a candidate for selection, only a service whose attribute indicates that the service is a free service, based on determination by said service attribute determination part.

6. The information communication terminal apparatus according to claim 5, further comprising a search part for performing search processing of retrieving a receivable service from said plurality of services,
   wherein said search part includes, as a candidate for said search processing, only a service whose attribute indicates that the service is a free service, based on determination by said service attribute determination part.

7. The information communication terminal apparatus according to claim 5, further comprising a preset part for performing preset processing of extracting a receivable service from said plurality of services, and assigning a predetermined preset button to a information for obtaining said receivable service,
   wherein said preset part includes, as a candidate for said preset processing, only a service whose attribute indicates that the service is a free service, based on determination by said service attribute determination part.

8. The information communication terminal apparatus according to claim 5, further comprising an information display part for performing information display processing of displaying information regarding a title and a content of each of said plurality of services,
   wherein said information display part includes, as a candidate for said information display processing, only a service whose attribute indicates that the service is a free service, based on determination by said service attribute determination part.

9. An information communication terminal apparatus for receiving a plurality of services, comprising:
   a service attribute determination part for determining an attribute of each of said plurality of services; and
   a service selection part for selecting a service to be used from among said plurality of services,
   wherein said service selection part includes, as a candidate for selection, only a service whose attribute indicates that the service is a subscribed pay service, based on determination by said service attribute determination part.

10. The information communication terminal apparatus according to claim 9, further comprising a search part for performing search processing of retrieving a receivable service from said plurality of services,
    wherein said search part includes, as a candidate for said search processing, only a service whose attribute indicates that the service is a subscribed pay service, based on determination by said service attribute determination part.

11. The information communication terminal apparatus according to claim 9, further comprising a preset part for performing preset processing of extracting a receivable service from said plurality of services, and assigning a predetermined preset button to a information for obtaining said receivable service,
    wherein said preset part includes, as a candidate for said preset processing, only a service whose attribute indicates that the service is a subscribed pay service, based on determination by said service attribute determination part.

12. The information communication terminal apparatus according to claim 9, further comprising an information display part for performing information display processing of displaying information regarding a title and a content of each of said plurality of services,
    wherein said information display part includes, as a candidate for said information display processing, only a service whose attribute indicates that the service is a subscribed pay service, based on determination by said service attribute determination part.

13. The information communication terminal apparatus according to claim 1, further comprising a search part for performing search processing of retrieving a non-subscribed pay service from said plurality of services, wherein said search part excludes, from candidates for said search processing, any service whose attribute indicates that the service is one of a subscribed pay service and a free service, based on determination by said service attribute determination part.

14. The information communication terminal apparatus according to claim 1, wherein said attribute of each of said plurality of services can be uniquely determined based on a service number.

15. The information communication terminal apparatus according to claim 14, wherein said service number comprises a header bit of data stored in a memory.

16. The information communication terminal apparatus according to claim 1, wherein received service search identifiers identify said attributes of said plurality of services.

17. The information communication terminal apparatus according to claim 16, wherein said receiver service search identifiers identify headers of each service based on detection of a bit value.

18. The information communication terminal apparatus according to claim 3, wherein said preset button is assigned to a highest priority service.

19. The information communication terminal apparatus according to claim 3, wherein said preset button is assigned to a highest reception quality service.

20. An information communication terminal apparatus, comprising:

an identifier indicating a desired service attribute;

a memory storing a plurality of received services and associated attributes;

a candidate selector selecting as a candidate selection set, at least one of said plurality of received services; and a service selector selecting at least one desired service from said candidate selection set;

wherein an attribute of each of the received services in said candidate selection set corresponds to said desired service attribute.

21. The apparatus of claim 20, wherein non-subscribed pay services are excluded from said candidate selection set.

22. The apparatus of claim 20, wherein said candidate selection set includes only free services.

23. The apparatus of claim 20, wherein said candidate selection set includes only subscribed pay services.

24. The apparatus of claim 20, further comprising a preset processor which assigns predetermined preset buttons to information for extracting each of said at least one desired service.

25. The apparatus of claim 20, wherein said service selector selects said at least one desired service based on reception level and error rate.

26. The apparatus of claim 20, wherein said received services and associated attributes are stored in a received service attribute table.

27. A method of receiving services, comprising:

identifying a desired service attribute;

storing a plurality of received services and associated attributes;

selecting a candidate selection set of at least one of said stored plurality of received services; and selecting at least one desired service from said candidate selection set;

wherein an attribute of each of the received services in said candidate selection set corresponds to said desired service attribute.

28. The method of claim 27, further comprising excluding non-subscribed pay services from said candidate selection set.

29. The method of claim 27, wherein said candidate selection set includes only free services.

30. The method of claim 27, wherein said candidate selection set includes only subscribed pay services.

31. The method of claim 27, further comprising assigning predetermined preset buttons to recall information for extracting each of said at least one desired service.

32. The method of claim 27, wherein said selecting at least one desired service is based on reception level and error rate.

33. The method of claim 27, wherein said received services and associated attributes are stored in a received service attribute table.

* * * * *